United States Patent
Pitsch

(10) Patent No.: US 10,518,459 B2
(45) Date of Patent: Dec. 31, 2019

(54) EXTRUSION DIE HAVING THERMALLY RESPONSIVE LIP ADJUSTMENT ASSEMBLY

(71) Applicant: NORDSON CORPORATION, Westlake, OH (US)

(72) Inventor: Dale P. Pitsch, Jim Falls, WI (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 16/383,641

(22) Filed: Apr. 14, 2019

(65) Prior Publication Data

US 2019/0232542 A1   Aug. 1, 2019

Related U.S. Application Data

(62) Division of application No. 15/276,782, filed on Sep. 26, 2016, now Pat. No. 10,272,609.

(51) Int. Cl.
    *B29C 48/30*      (2019.01)
    *B29C 48/08*      (2019.01)
    *B29C 48/31*      (2019.01)
    *B29C 48/25*      (2019.01)
    (Continued)

(52) U.S. Cl.
CPC .............. *B29C 48/30* (2019.02); *B29C 48/08* (2019.02); *B29C 48/256* (2019.02); *B29C 48/2528* (2019.02); *B29C 48/302* (2019.02); *B29C 48/313* (2019.02); *B29C 48/92* (2019.02); *B29C 48/2562* (2019.02); *B29C 48/2566* (2019.02);
(Continued)

(58) Field of Classification Search
CPC ..... B29C 48/30; B29C 48/302; B29C 48/256; B29C 48/313; B29C 48/08; B29C 48/92
See application file for complete search history.

(56) References Cited

U.S. PATENT DOCUMENTS 3,877,857 A * 4/1975 Melead .................. B29C 48/30
    425/133.5
4,594,063 A     6/1986 Reifenhaeuser et al.
(Continued)

FOREIGN PATENT DOCUMENTS

DE     202013009000 U1    1/2015
JP       08-085145 A       4/1996
(Continued)

OTHER PUBLICATIONS

European search report dated Feb. 23, 2018 for EP Application 17191399.

*Primary Examiner* — Nahida Sultana
(74) *Attorney, Agent, or Firm* — Baker & Hostetler LLP

(57) ABSTRACT

A method for replacing one or more components of a lip adjustment assembly mounted to a die body of an extrusion die is disclosed. Initially, a translating unit of the lip adjustment assembly is accessed through an exposed end of the lip adjustment assembly. Then, an adjustment actuator is removed from a translator of the translating unit. The translator is decoupled from a rod of the translating unit so that the translator is removable from the lip adjustment assembly and with respect to the rod. Next, the translator is removed from the lip adjustment assembly and a first component of the translating unit is replaced with a second component of the translating unit.

10 Claims, 19 Drawing Sheets

(51) Int. Cl.
  *B29C 48/92* (2019.01)
  *B29L 31/00* (2006.01)
(52) U.S. Cl.
  CPC .............. *B29C 2948/92628* (2019.02); *B29C 2948/92647* (2019.02); *B29L 2031/757* (2013.01)

(56) References Cited

U.S. PATENT DOCUMENTS

| | | | |
|---|---|---|---|
| 4,781,562 A * | 11/1988 | Sano | B29C 48/30 |
| | | | 425/141 |
| 4,860,361 A | 8/1989 | Sato et al. | |
| 4,978,289 A | 12/1990 | Maejima | |
| 5,253,992 A | 10/1993 | Reifenhaeuser | |
| 5,273,420 A | 12/1993 | Gross et al. | |
| 5,587,184 A * | 12/1996 | Leonard | B29C 48/30 |
| | | | 425/133.5 |
| 5,622,730 A * | 4/1997 | Nitta | B29C 48/30 |
| | | | 425/141 |
| 5,888,556 A | 3/1999 | Cloeren et al. | |
| 6,017,207 A | 1/2000 | Druschel | |
| 6,273,701 B1 * | 8/2001 | Moriarity | B29C 48/30 |
| | | | 425/141 |
| 6,663,375 B1 | 12/2003 | Ulcej | |
| 8,491,296 B2 | 7/2013 | Nakano | |
| 9,302,420 B1 * | 4/2016 | Darrow | B29C 48/92 |
| 9,358,717 B1 | 6/2016 | Schemenauer et al. | |
| 2006/0040009 A1 * | 2/2006 | Rubhausen | B29C 48/30 |
| | | | 425/131.1 |
| 2006/0165835 A1 | 7/2006 | Vegelbacher et al. | |
| 2008/0057148 A1 | 3/2008 | Pitch et al. | |
| 2008/0274223 A1 * | 11/2008 | Cloeren | B29C 48/30 |
| | | | 425/133.5 |
| 2009/0035410 A1 * | 2/2009 | Mizunuma | B29C 48/30 |
| | | | 425/170 |
| 2011/0206795 A1 | 8/2011 | Ulcej et al. | |
| 2012/0313274 A1 * | 12/2012 | Loukusa | B05C 5/0262 |
| | | | 264/40.1 |
| 2012/0313275 A1 * | 12/2012 | Trice | B05C 5/0262 |
| | | | 264/40.1 |
| 2013/0020737 A1 | 1/2013 | Ulcej | |
| 2015/0104537 A1 | 4/2015 | Sedivy | |
| 2015/0343690 A1 | 12/2015 | Sedivy | |
| 2015/0367588 A1 * | 12/2015 | Gramazio | E04G 11/22 |
| | | | 425/64 |
| 2016/0271855 A1 | 9/2016 | Truscott | |

FOREIGN PATENT DOCUMENTS

| | | |
|---|---|---|
| JP | 2002-178385 A | 6/2002 |
| JP | 2005-238505 A | 9/2005 |
| JP | 2007-190682 A | 8/2007 |

\* cited by examiner

EXTRUSION DIE HAVING THERMALLY RESPONSIVE LIP ADJUSTMENT ASSEMBLY

CROSS REFERENCE TO RELATED APPLICATIONS

This application is a divisional of U.S. patent application Ser. No. 15/276,782, filed Sep. 26, 2016, and published as U.S. Patent App. Pub. No. 2018/0085988 on Mar. 29, 2018, the disclosure of which is hereby incorporated by reference herein.

TECHNICAL FIELD

The present disclosure relates to an extrusion die having a thermally responsive lip adjustment assembly.

BACKGROUND

Extrusion dies are used to form polymer films, laminates, and the like. An extrusion die forces a molten polymeric material through a gap defined by spaced apart lips to form the extruded film, typically called an extrudate. The extrudate is cooled as exits that gap and is collected by a collector or device for packaging into a form suitable for later processing. The size of the gap, among other factors, can define the thickness or gauge of the extrudate. A thermally responsive lip adjustment assembly can be used to help control both width-wise and machine-direction variations in extrudate gauge. Lip adjustment assemblies typically include a translator and a rod coupled to the translator. The translator is configured to expand and contract in response to temperature changes. The rod to moves with expansion and contraction of the translator. Movement of the rod, in turn, causes the lip to move, thereby adjusting the gap dimension as needed. Movement of the translator can be controlled with a control system during processing in response to gauge measurement at or downstream from the gap. The translator can also be manually adjusted as needed to adjust the gap dimension.

Repair and maintenance of typical lip adjustment assemblies can be complex and time consuming. Disassembly procedures require the removal of a number of parts to access internal parts of the lip adjustment assembly intended for repair or replacement. For example, there are typically a number of parts that must be removed to access the translator and rod, such as cover plates, retainer bars, wire boxes, etc. Furthermore, these parts may be obstructed by other components of the extrusion die, collector devices near the gap. After the intended repair or replacement is finished, reassembly is just as complex and time consuming. The result is significant time lost due to maintenance that would otherwise be used to manufacture extruded films. Time lost increases maintenance costs, increases product costs, and has a negative impact on the return on investment in the extrusion die, all of which are generally undesirable.

SUMMARY

Therefore, there is a need for an extrusion die having lip adjustment assembly that simplifies assembly and maintenance. Accordingly, an embodiment of the present disclosure is an extrusion die for forming an extrudate. The extrusion die includes a first die body having a first lip, and a second die body having a second lip that is positioned opposite and adjacent to the first lip, and a gap extending in a first direction from the first lip to the second lip. The gap also extends in a second direction perpendicular to the first direction. The extrusion die includes a lip adjustment assembly mounted to the first die body and configured to adjust the position of the first lip relative to the second lip to thereby adjust a thickness of the extrudate that exits the gap. The lip adjustment assembly has a working end adjacent to the first lip, an exposed end opposite to the working end, and a translating unit between the exposed end and the working end. The lip adjustment assembly is positioned so as to be angularly offset with respect to the second direction. The translating unit is configured to move the working end to adjust the position of the first lip. The translating unit has a translator, a mounting member coupled to the translator, and a rod coupled to the mounting member so that the translator is fixed with respect to the rod. The mounting member configured to be accessible from the exposed end to decouple the translator from the rod so as to remove the translator from the lip adjustment assembly.

BRIEF DESCRIPTION OF THE DRAWINGS

The foregoing summary, as well as the following detailed description of illustrative embodiments of the present application, will be better understood when read in conjunction with the appended drawings. For purposes of illustrating the present application, there is shown in the drawings illustrative embodiments of the disclosure. It should be understood, however, that the application is not limited to the precise arrangements and instrumentalities shown. In the drawings.

DETAILED DESCRIPTION OF ILLUSTRATIVE EMBODIMENTS

Figure 1:
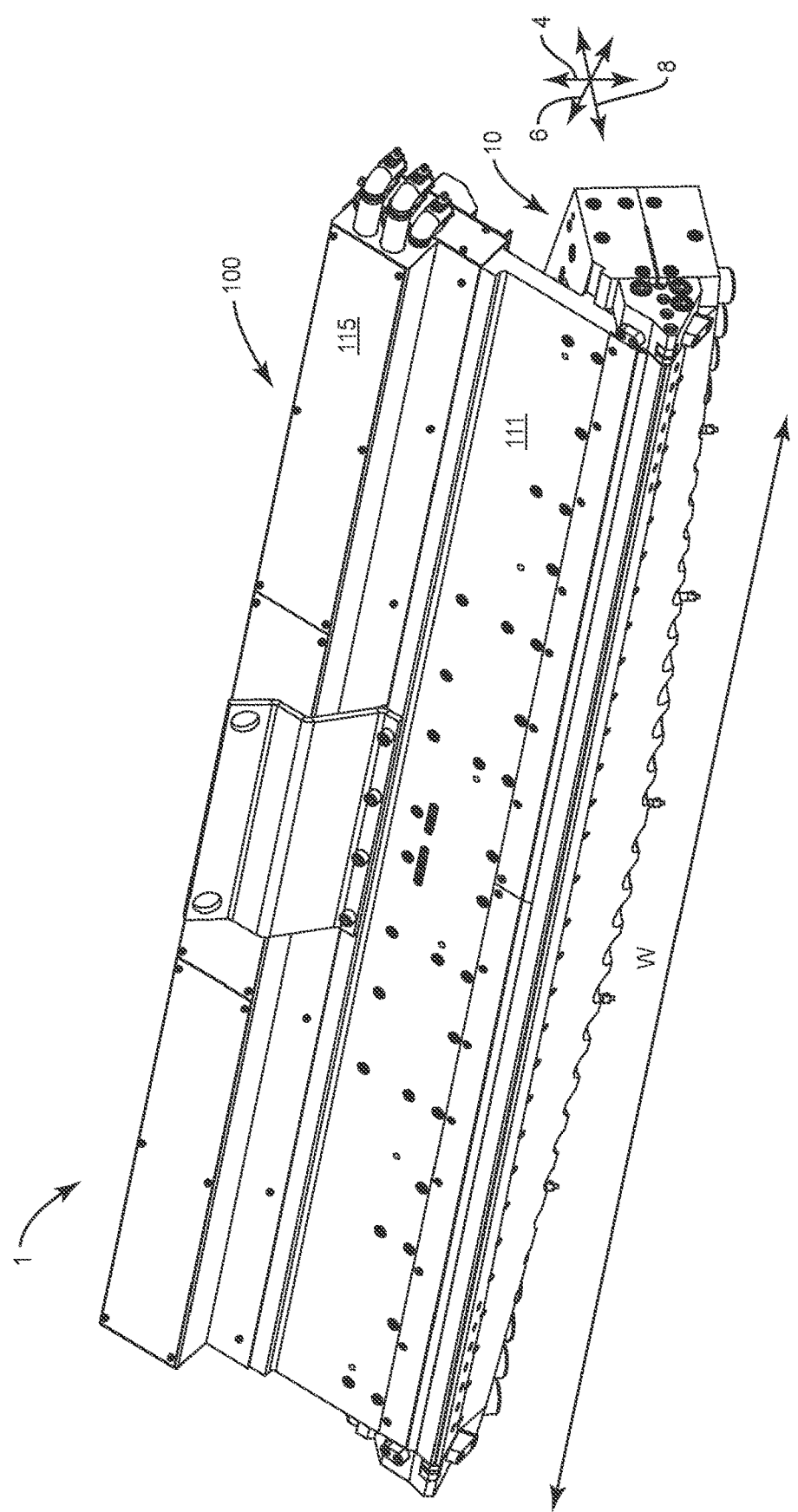
FIGS. 1 and 2 are top perspective and side views, respectively, of an extrusion die according to an embodiment of the present disclosure.

Referring to FIGS. 1-3B, an extrusion die system 1 for forming a polymeric film 2 (or extrudate) is illustrated. The extrusion die system 1 includes an extrusion die 10 and a lip adjustment assembly 100 mounted to the extrusion die 10. The lip adjustment assembly 100 controls the gauge the polymeric film 2 (or extrudate) emanating from a gap 20 of the extrusion die 10, both locally and across a width W the extrusion die 10. If the gauge of the extrudate 2 is determined to be too thick (either across the width W of the extrusion die 10, or just locally in a certain region of the extrusion die 10), the lip adjustment assembly 100 can be actuated to decrease a dimension of the gap 20, thereby reducing the extrudate gauge to the desired gauge. The lip adjustment assembly 100 as illustrated is a thermally responsive lip adjustment assembly and can be actuated in response to changing a temperature of one or more components of the lip adjustment assembly 100, as will be further described below.

The illustrated lip adjustment assembly 100 is configured as a push-rod embodiment whereby the lip adjustment assembly is designed to push the lip 16 to adjust the gap 20. In an alternative embodiments, however, the lip adjustment assembly 100 is configured as a push-pull embodiment wherein the lip adjustment assembly 100 is designed to both push the lip 16 and pull the lip 16 to adjust the gap 20.

Figure 3A:
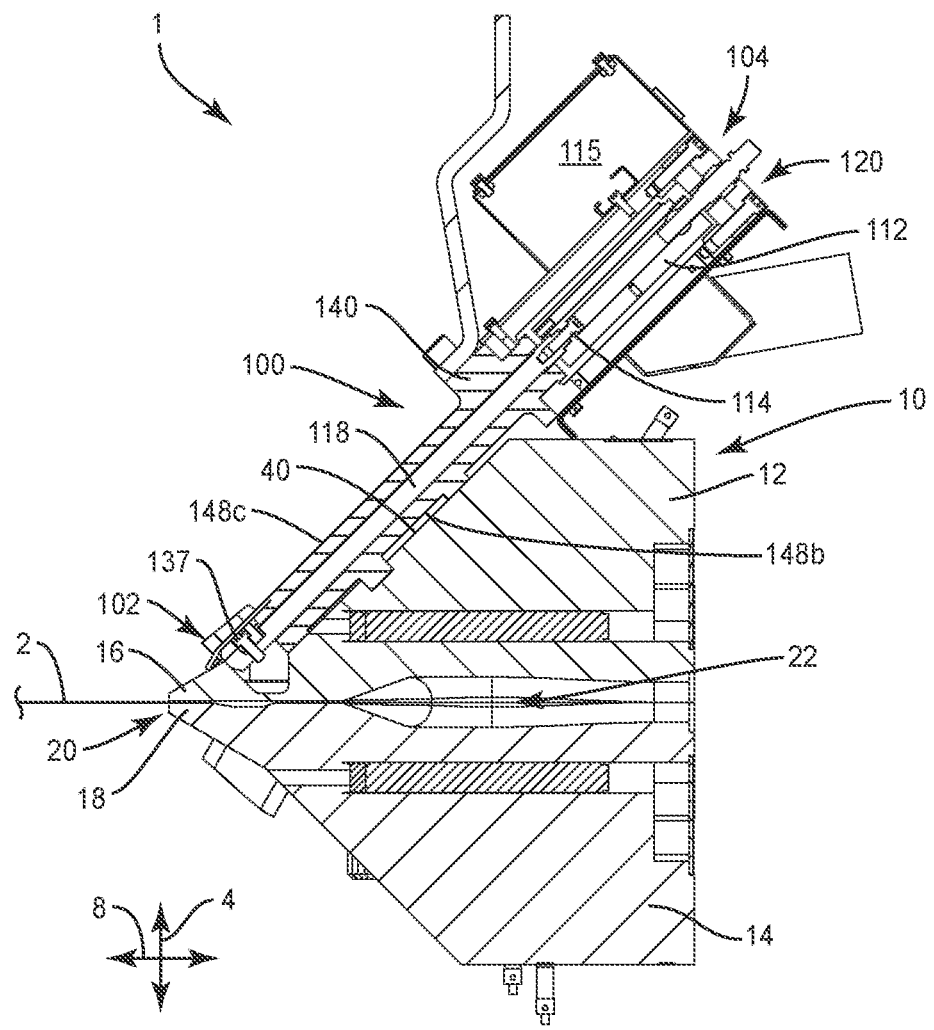
FIG. 3A is a sectional side view of a portion of the extrusion die illustrated in FIG. 2, illustrating a lip adjustment assembly mounted to a die body.
Figure 3B:
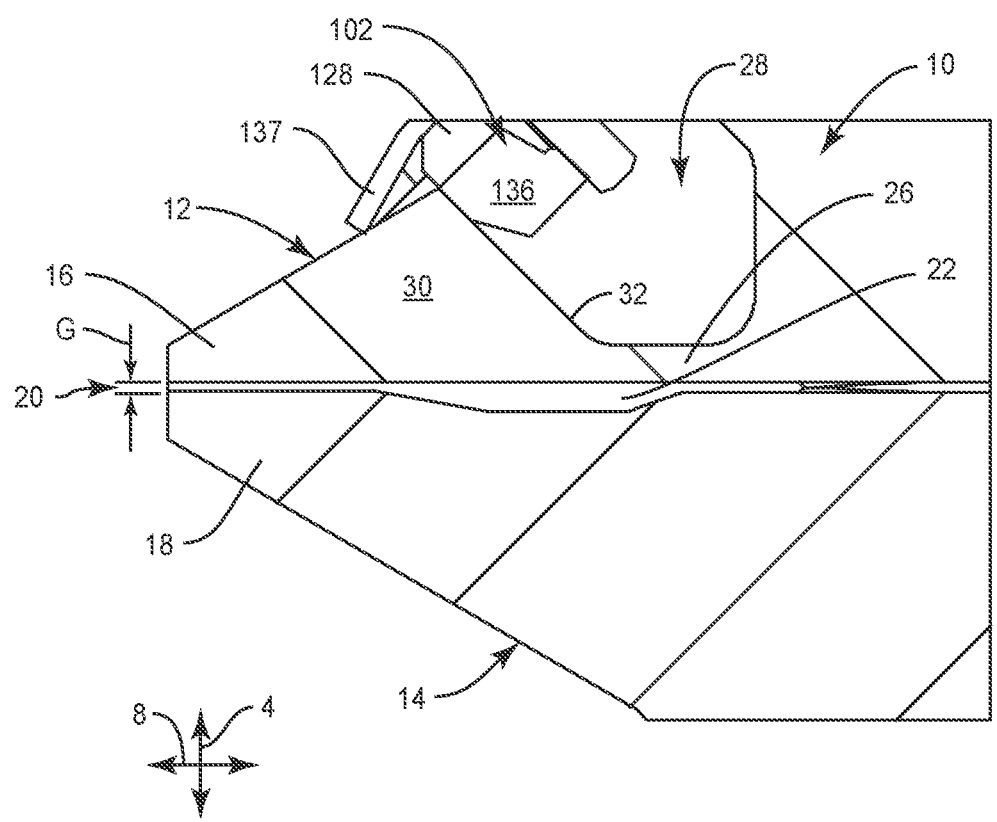
FIG. 3B is a detailed, sectional side view of a portion of the extrusion die illustrated in FIG. 3A, illustrating the gap between the adjacent lips of the extrusion die.

Referring to FIGS. 3A and 3B, the extrusion die system 1 processes polymeric material into an extrudate 2. The extrusion die system 1 may include a melt unit, a feedblock coupled to the extrusion die 10, and one or more passageways 22 defined by the extrusion die 10 and that terminate at the gap 20. The melt unit and feedblock are not shown in the drawings. The melt unit elevates the temperature of the polymeric material to form a molten polymer, which is presented to the feedblock. Alternatively, the polymeric material can be presented to the die via an adaptor The feedblock (or adaptor) routes the molten polymer into the passageways 22 in the extrusion die 10. The passageways 22 direct the molten polymer to the gap 20. The extrusion die system 1 may also include a collecting unit (not shown) positioned proximate to the gap 20 that is used to collect the extrudate 2 into a form for further processing. The polymeric material as used herein may be a thermoplastic polymer, synthetic resin, or a liquid crystalline polymer. However, other flowable materials can be processed using extrusion die system 1, such as an adhesive. Furthermore, it should be appreciated that the extrusion die system 1 can be figured for single polymer processing or multiple polymer processing. For instance, the feedblock and extrusion die 10 can define a plurality of different passages each configured to process and guide different polymeric materials out of the gap 20 in the form a multi-component extrudate or film. Furthermore, it should be appreciated that the die can be used to process non-polymeric materials.

As shown FIGS. 1-3B, the extrusion die 10 includes a first die body 12 and a second die body 14 that define the gap 20 through which the extrudate 2 exits the extrusion die 10. The first die body 12 and the second die body 14 include a first lip 16 and a second lip 18, respectively, that together define an exit opening in the form of the gap 20. The first die body 12 and the second die body 14 are positioned opposite with respect to each other along a first direction 4. In this regard, the first lip 16 is positioned opposite and adjacent to the second lip 18. The gap 20 therefore extends along the first direction 4 from the first lip 16 to the second lip 18 and also along a second direction 6 that is perpendicular to the first direction 4. The extrudate 2 exits the gap 20 along a third direction 8 that is perpendicular to the first direction 4 and the second direction 6. In the present disclosure, the first direction 4 is referred to as a thickness direction, the second direction 6 is aligned with the width W and may be referred to as width direction, and the third direction 8 is referred to as a flow direction. As illustrated, the first and second die bodies 12 and 14 define a gap distance G that is the distance that separates the first lip 16 and second lip 18 at a given location along the width W of the extrusion die 10. The gap distance G is parallel to the thickness (or first) direction 4. As discussed above, the lip adjustment assembly 100 is operable to move one of the first lip 16 or the second lip 18 to adjust the gap distance G, which in turn, controls the gauge of the extrudate 2, as discussed above.

As best shown in FIG. 3B, at least one of the first lip 16 and the second lip 18 is moveable to allow for adjustment of the gap 20. In accordance with the illustrated embodiment, the first die body 12 includes the movable lip, illustrated as the first lip 16. The moveable lip 16 includes a flex hinge 26, an engagement member 30 coupled to the flex hinge 26 and that partially defines a recess 28, typically called a flex cut. The flex hinge 26 is thin enough to bend in response to a force applied to the engagement member 30 by the lip adjustment assembly 100. The engagement member 30 is in contact with a working end 102 of the lip adjustment assembly 100. The engagement member 30 includes an engagement surface 32. A working end 102 of the of the lip adjustment assembly 100, for example a forward end 136 of the rod 118, is in contact with the engagement surface 32 of the lip 16.

Figure 2:
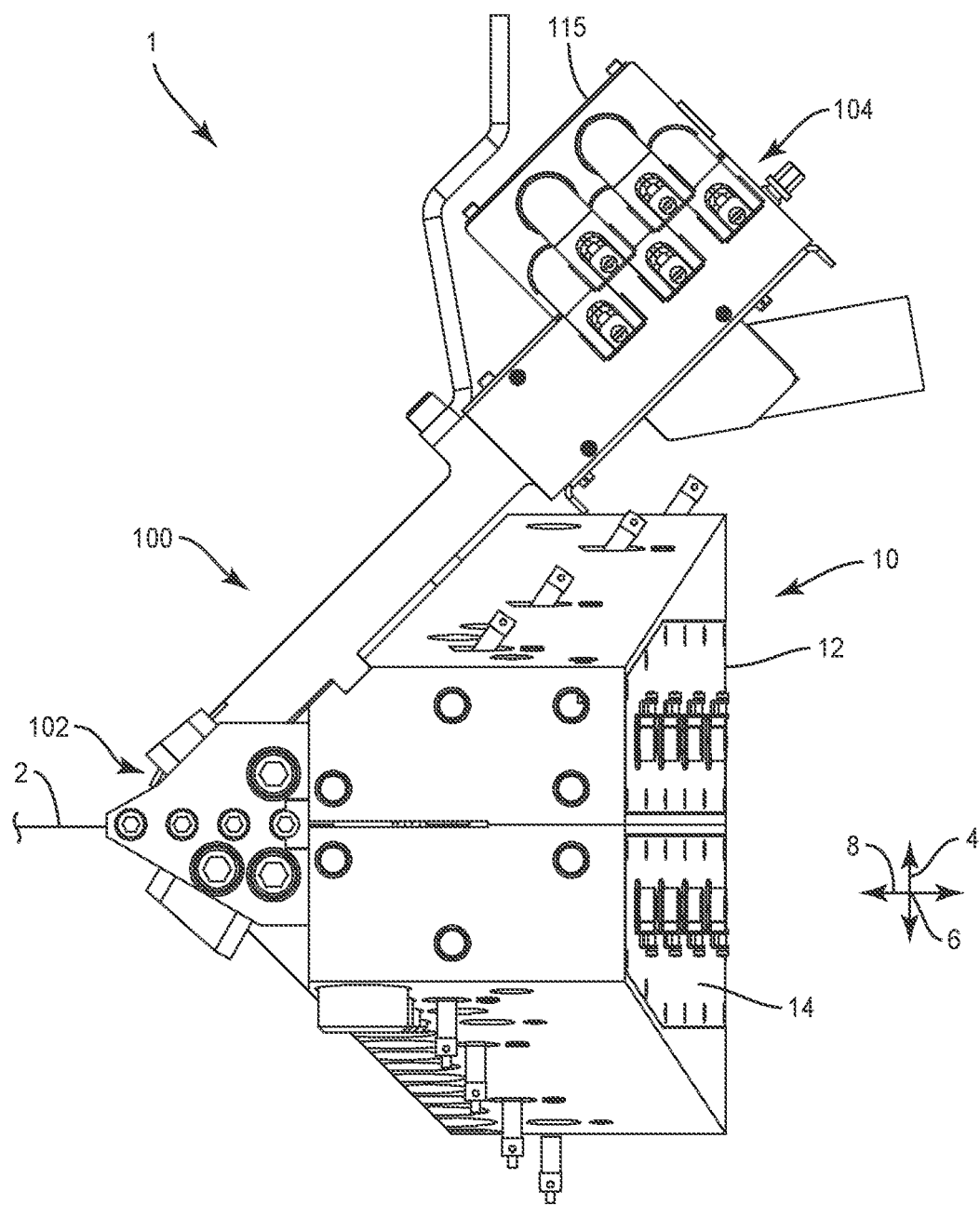

As shown in FIGS. 2-3B, the lip adjustment assembly 100 is mounted to the extrusion die 10. The lip adjustment assembly 100 is operable move the first lip 16 relative to the second lip 18. As illustrated, the lip adjustment assembly 100 is mounted to a face 40 of the first die body 12 via a plurality of mounting bolts 42. The face 40 of the first die body 12 is angled with respect to the first direction 4 and the second direction 6 such that the mounted lip adjustment assembly 100 is generally angularly offset with respect to the first direction 4 and the second direction 6. In one alternative embodiment, the face 40 of the first die body 12 is substantially perpendicular to the flow direction 8 of the extrudate 2 out of the extrusion die 10. In this regard, the lip adjustment assembly 100 is generally aligned with the first direction 4 and perpendicular to both a) the second direction 6, and b) the flow direction 8.

Figure 4:
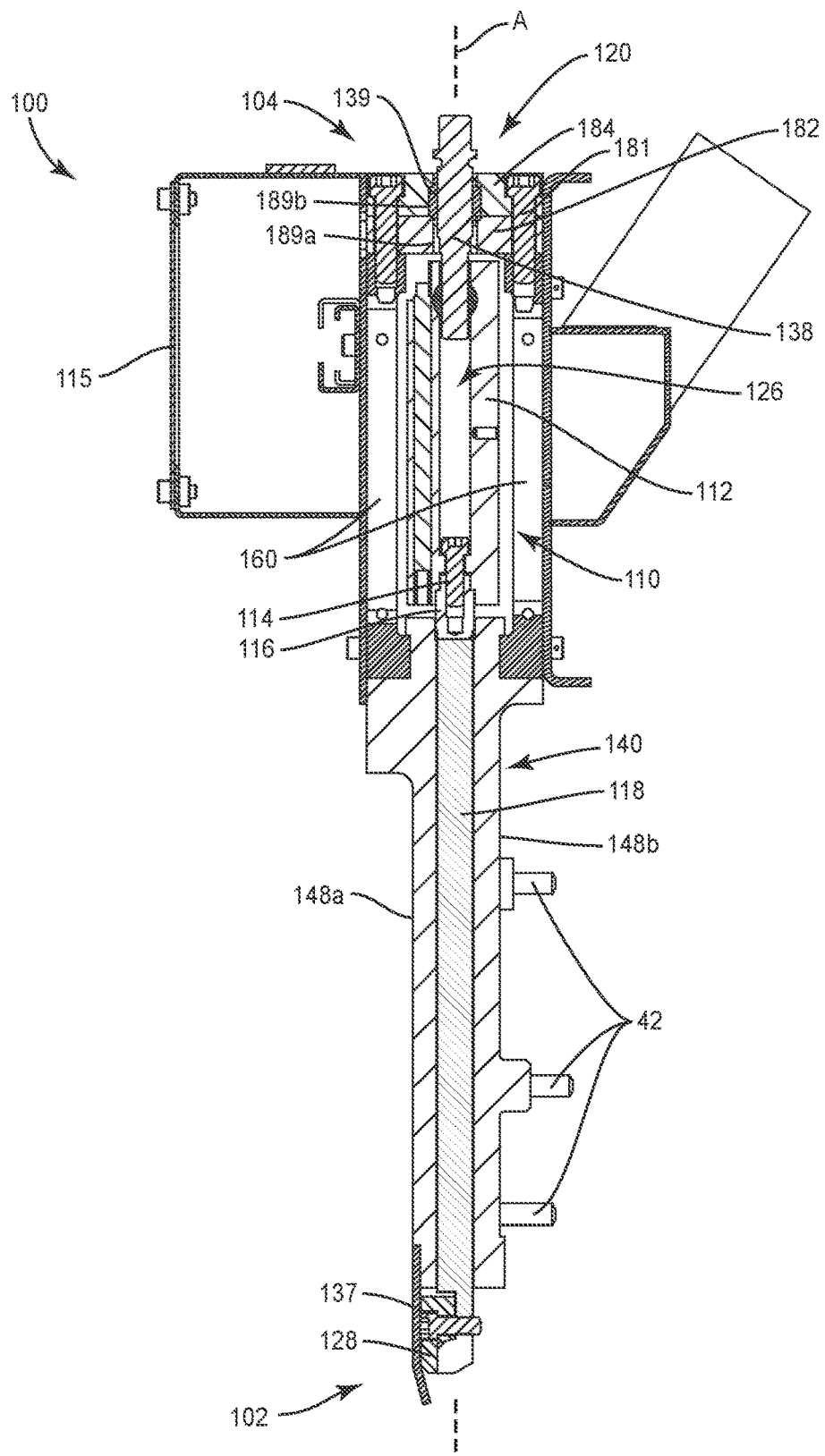
FIG. 4 is a sectional side view of the lip adjustment assembly illustrated in FIGS. 1-3B.
Figure 5:
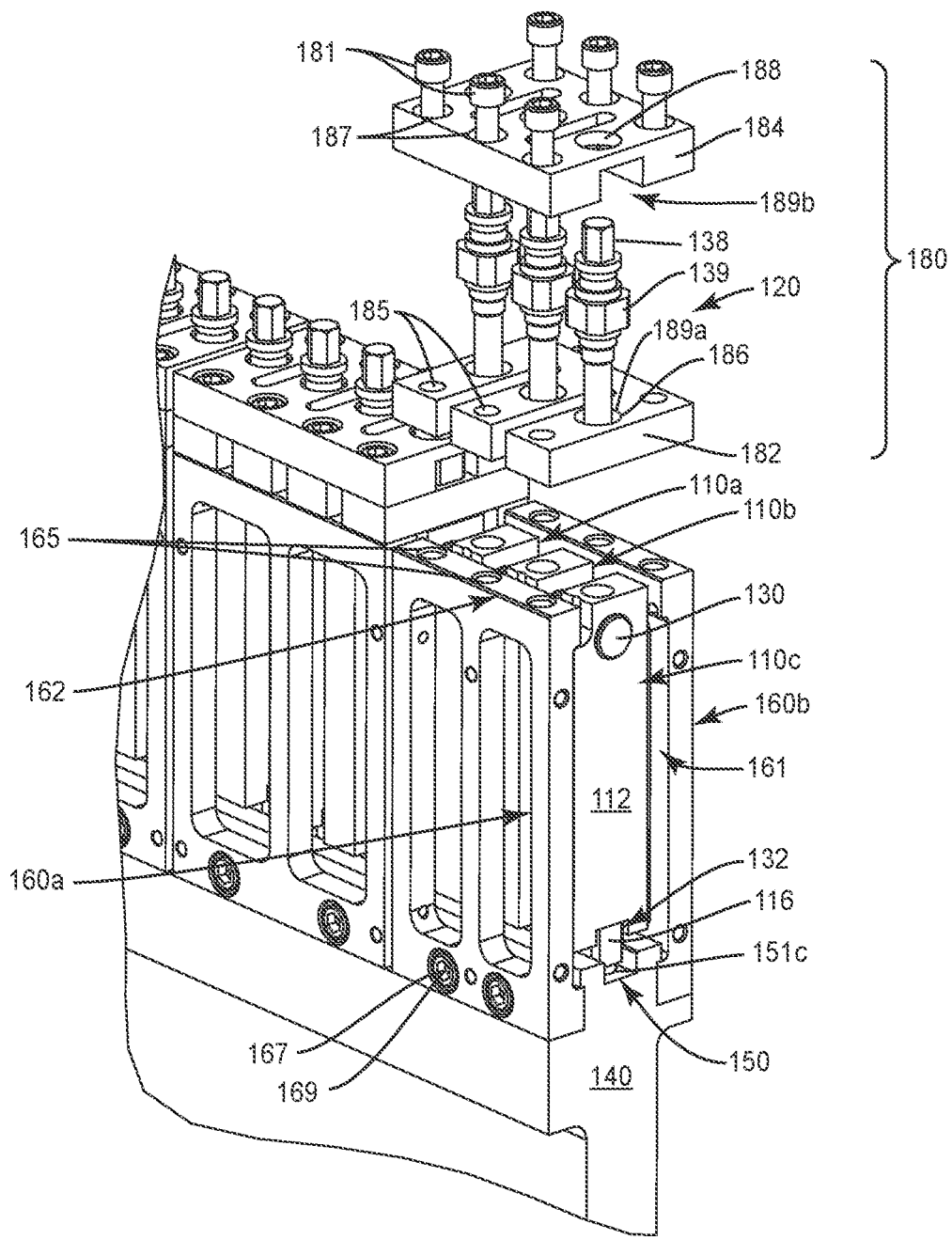
FIG. 5 is a partial exploded perspective view of the lip adjustment assembly illustrated in FIGS. 3A-3B.
Figure 6:
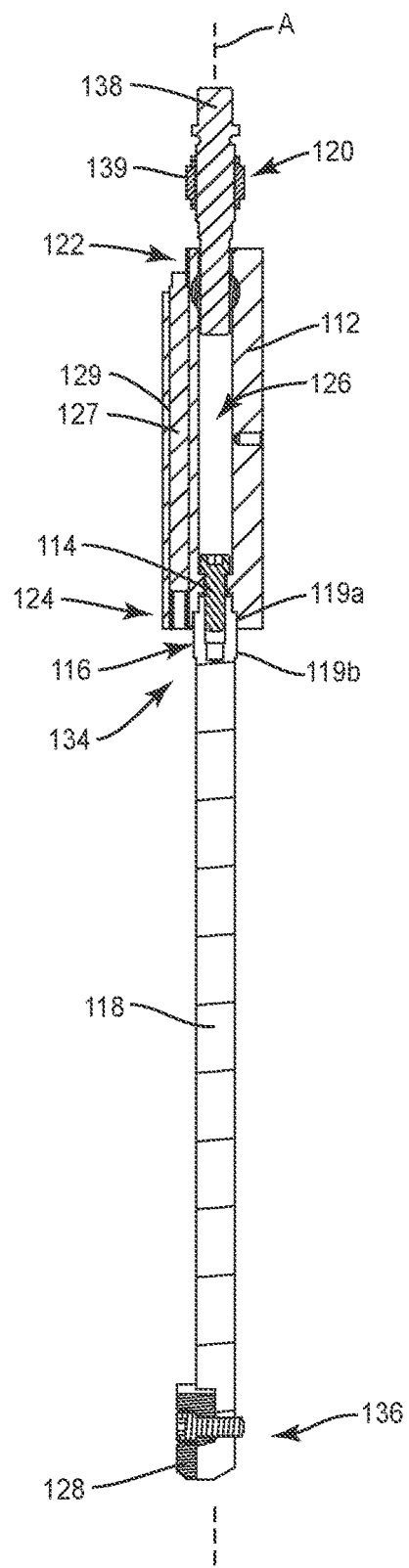
FIG. 6 is a sectional side view of a translating unit of the lip adjustment assembly illustrated in FIG. 4.

Referring to FIGS. 4-6, the lip adjustment assembly 100 has a working end 102 adjacent to the first lip 16, and an exposed end 104 spaced from the working end 102 along a central axis A. The working end 102 is designed to engage and adjust the position of the lip 16. The central axis A defines a centerline of the lip adjustment assembly 100 and is angularly offset with respect the first direction 4 and second direction 6. However, as discussed above the centerline of the lip adjustment assembly 100 may be a) aligned with the first direction 4, and b) perpendicular to the second direction 6 and the third or flow direction 8. The lip adjustment assembly 100 includes a translating unit 110, an adjustment bar 140, a plurality of standoff frames 160 that support the translating unit 110 with respect to the adjustment bar 140, and a retainer assembly 180 that couples the translating unit 110 to standoff frames 160. Also included is a junction box 115 adjacent the exposed end 104 that routes wire and electronics that operate the translating unit 110. The junction box 115 is offset from the exposed end 104 of the lip adjustment assembly 100. This improves access the retainer assembly 180 and other components of the lip adjustment assembly 100, which helps reduce maintenance complexity. The exposed end 104 is substantially unobstructed to provide access to the translating unit 110. Each component of the lip adjustment assembly will be described next.

Referring to FIGS. 4-6, the translating unit 110 extends between the working end 102 and the exposed end 104 along the central axis A. The translating unit 110 as used herein includes a translator 112, a mounting member 114 coupled to the translator 112, a rod 118 coupled to the mounting member 114 that fixes the translator 112 to the rod 118, and an adjustment actuator 120 coupled to the translator 112.

The lip adjustment assembly 100 may also include an adjustment block 128 coupled to the forward end 136 of the rod 118 as shown in the figures. For instance, the adjustment block 128 is optional for a push-rod type of lip adjustment assembly 100 as illustrated in the figures. In a push-rod type of lip adjustment assembly, the translating unit is configured to push against the lip 16 to adjust the gap 20. In alternative embodiments, however, the lip adjustment assembly 100 is configured as push-pull type of lip adjustment assembly. In a push-pull type of lip adjustment assembly, the push rod 118 is used to push the lip 16 to decrease the size of the gap 20 and the adjustment block (which may be similar to adjustment block 128) pulls the lip 16 to open up the gap 20. In such the push-pull lip type of lip adjustment assembly 100, the adjustment block includes a projection that seats in a groove defined by the lip 16 of the die. When the translator retracts the rod 118, the adjustment block, through interference between the projection and groove, pulls the lip 16 to adjust the gap 20, as discussed above. It should be appreciated that features of the present disclosure can be used in a push-rod type of lip adjustment assembly or push-pull type lip adjustment assembly.

Referring now to FIG. 6, the translator 112 includes a trailing end 122, a leading end 124, a chamber 126 that extends from the trailing end 122 to the leading end 124 along the axis A, and an elongate bore 129 that houses a heating element 127. The translator also includes an insert cavity (not numbered) that houses an adjustment insert 130. The leading end 124 of the translator 112 includes a mounting cavity 132 that receives a rotation inhibitor 116, as further explained below.

Continuing with FIG. 6, the rod 118 is elongated along the central axis A and defines a back end 134 and a forward end 136 opposite the back end 134 along the axis A. The mounting member 114 is removably coupled to the back end 134 of the rod 118. The forward end 136 is coupled to and supports the adjustment block 128. The adjustment block 128 is mounted to the forward end 136 of the rod 118 via a mounting bolt (not numbered) so that movement of the rod 118 causes movement of the adjustment block 128. The leading end 124 of the translator 112 is configured to transmit a pushing force to the back end 134 of the rod 118. The forward end 136 of the rod 118, in turn, transmits the pushing force to the first lip 16. The rod 118 can optionally be defined by a single monolithic body, such as a solid rod.

Furthermore, as discussed above, in a push-pull type of lip adjustment assembly, the translator transmits both a pushing force to the lip 16 and a pulling force to the lip 16. In such an embodiment, the adjustment block is mounted to the forward end 136 of the rod 118 so that movement of the rod 118 causes movement of the adjustment block 128. The pushing force is applied to the lip 16 as described above. However, the leading end 124 of the translator 112 is configured to transmit a pulling force to the back end 134 of the rod 118, which pulls the back the adjustment block. The adjustment block of the rod 118, in turn, transmits the pulling force to the first lip 16.

Figure 7:
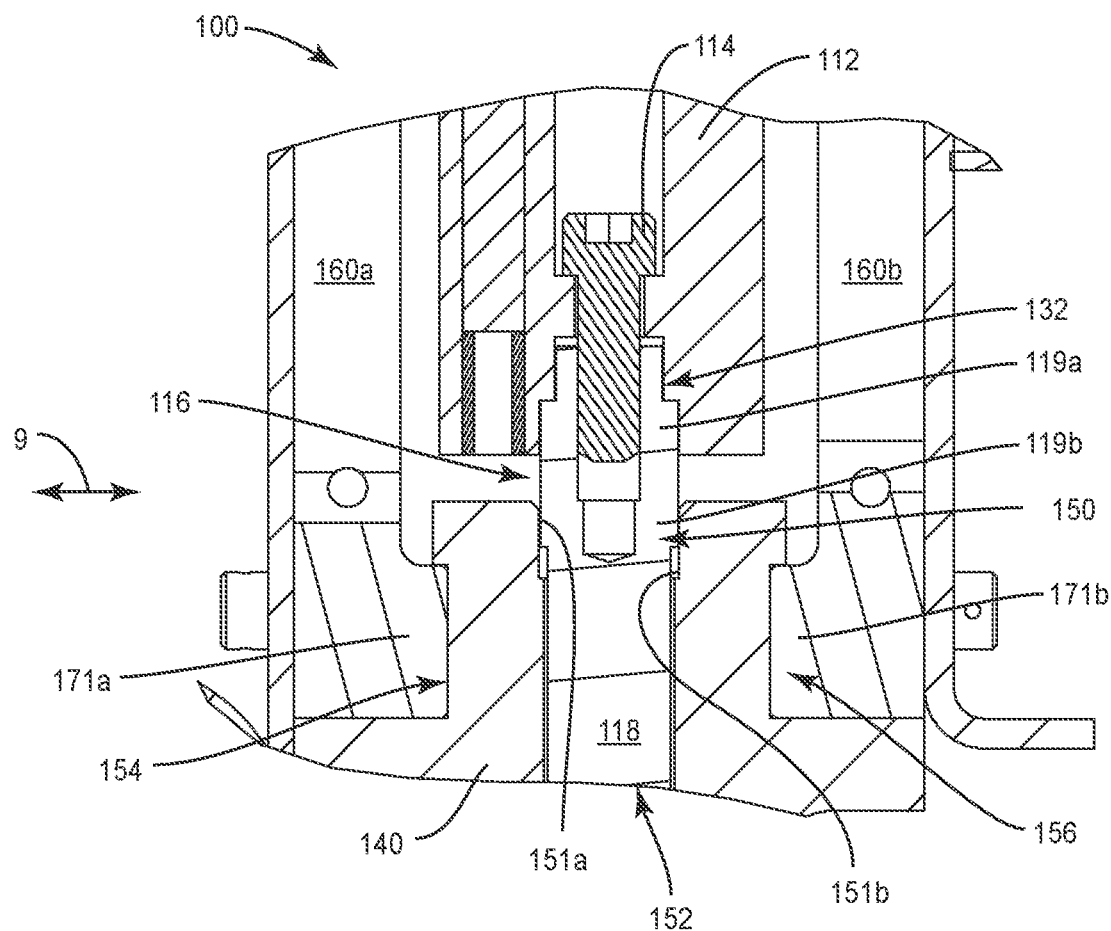
FIG. 7 is a detailed sectional side view of a portion of lip adjustment assembly illustrated in FIG. 4.

As shown in FIGS. 6 and 7, the mounting member 114 fixes the translator 112 to the back end 134 of the rod 118. The mounting member 114 is also configured to be accessible from the exposed end 104 to decouple the translator 112 from the rod 118 so as to remove the translator 112 from the lip adjustment assembly 100 as needed. Specifically, the translator 112 is removable from the lip adjustment assembly 100 with respect to the rod 118 without having to otherwise decouple the rod 118 from other components of the first die body 12 or the lip adjustment assembly 100.

Referring to FIGS. 4-6, the adjustment actuator 120 is movably coupled to the translator 112 via the adjustment insert 130 housed in the translator 112. The adjustment actuator 120 includes an adjustment screw 138 and an adjustment nut 139. The adjustment screw 138 is threadably coupled to the adjustment insert 130 and to the adjustment nut 139. The adjustment nut 139, however, is rotationally fixed to the retainer assembly 180. Thus, rotation of the adjustment screw 138 by an operator causes the translator 112 to move along the central axis A with respect to the fixed adjustment nut 139. The direction translator of movement is dependent on the direction the adjustment screw 138 is rotated. Rotation in a first rotational direction causes the translator 112 to move toward the exposed end 104 while rotation in a second rotational direction that is opposite the first rotational direction causes the translator 112 to move toward the lip 16. The adjustment actuator 120 can thus be used to manually translate the translator 112 and thus the rod 118, which in turn manually changes the position of the lip 16 and adjusts the gap 20.

Figure 9:
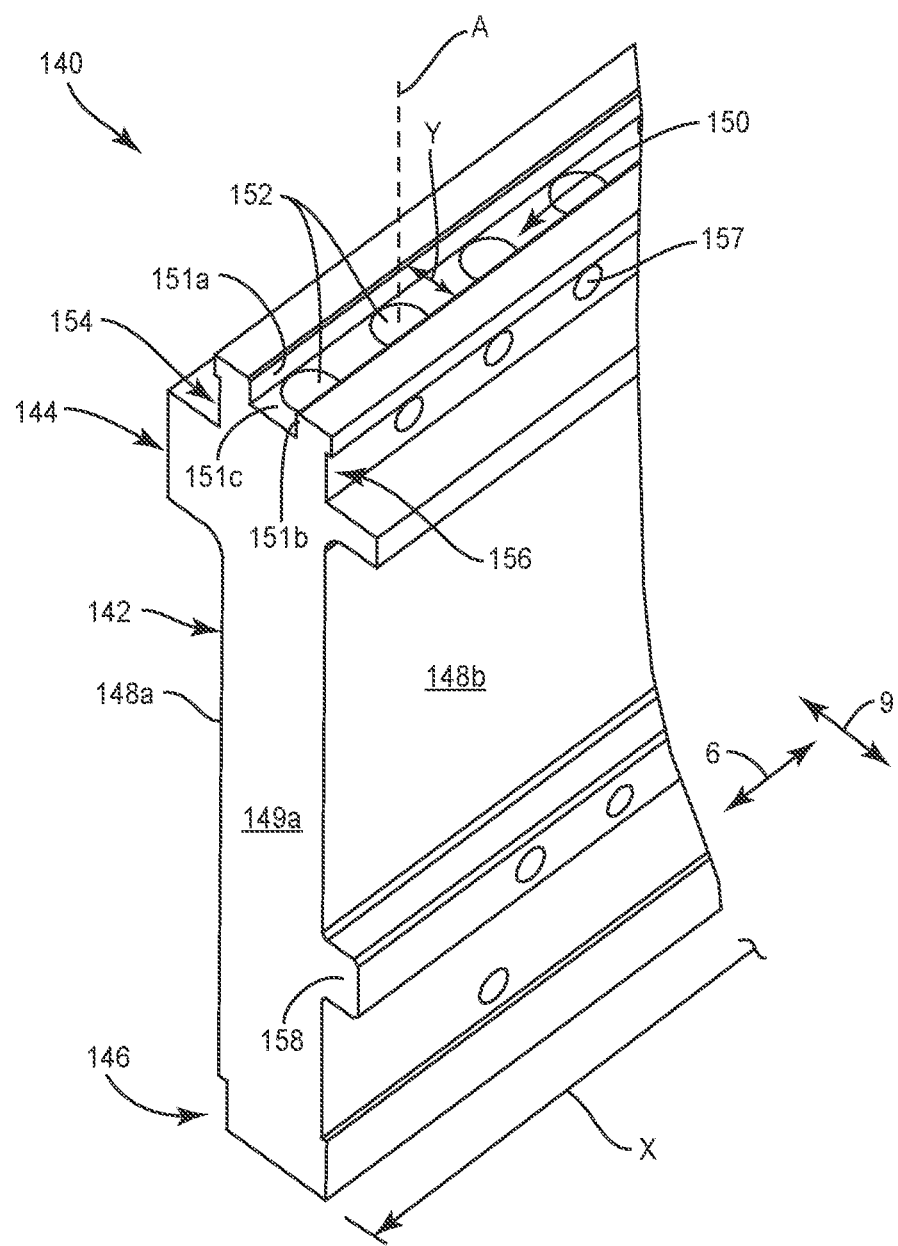
FIG. 9 is a perspective end view of an adjustment bar of the lip adjustment assembly illustrated in FIG. 4.

FIGS. 4, 7, and 9 illustrate the adjustment bar 140 of the lip adjustment assembly 100. The adjustment bar 140 supports the translator 112, standoff frames 160, and the rod 118. The adjustment bar 140 includes adjustment body 142 configured to be mounted to the first die body 12 via mounting bolts 42 (mounting bolts shown in FIG. 3A). While the adjustment bar 140 is illustrated as a separate part that attached to the first die body 12, the adjustment bar 140 and the first die body can be a monolithic unit. The adjustment body 142 includes an engagement end 144, a leading end 146 opposite the engagement end 144 along the central axis A, an exterior side 148a and an interior side 148b that faces the first die body 12. The mounting bolts 42 that secure the adjustment bar 140 to the first die body 12 are accessible from the exterior side 148a of the adjustment bar 140. Thus, an operator can access the mounting bolts 42 directly without having to remove other components of the lip adjustment assembly 100 or extrusion die 10. A cover plate 137 (FIGS. 3A and 6) is coupled to the leading end of the adjustment bar 140 and covers the adjustment block 128. The adjustment body 142 also includes opposed first and second side ends 149a and 149b (149b not shown) that are spaced apart with respect to each other along the second direction 6. The adjustment bar 140 thus defines a width X that extends from side end 149a to side end 149b.

Referring to FIGS. 7 and 9, the adjustment bar 140 includes a channel 150 that receives a portion of the rotation inhibitor 116 of the translating unit 110. The adjustment body 142, in particular the engagement end 144, includes a first side surface 151a, a second side surface 151b that faces the first side surface 151a, and a bottom surface 151c that extends from the first side surface 151a to the second side surface 151b. The surfaces 151a, 151b, and 151c together define the channel 150. The adjustment body 142 includes a channel dimension Y that extends from the surface 151a to the side surface 151b along a direction 9 that is perpendicular the central axis A. The channel 150 is also elongate the second direction 6, or width X, of the adjustment bar 140. The channel dimension Y conforms to a similar dimension of a portion of the rotation inhibitor 116. In this regard, the rotation inhibitor 116 is rotationally fixed in the channel 150.

Referring now to FIGS. 4, 7, and 9, the adjustment bar 140 further includes a plurality of elongated bores 152 each of which receive the rod 118 of the translating unit 110. Each bore 152 extend through the adjustment body 142 from the channel 150 (or bottom surface 151b) to the leading end 146. Each bore 152 is sized to receive therein the rod 118 such that the rod 118 extends through the adjustment bar 140 and out of the leading end 146 of the adjustment bar 140.

Continuing with FIGS. 4, 7, and 9, the adjustment bar 140, and in particular the engagement end 144, includes a first keyway 154 and a second keyway 156 opposite the first keyway 154. The first and second keyways 154 and 156 receive and retain the first and second standoff frames 160. The engagement end 144 also includes securing holes 157 that extend transversely with respect to the channel 150. The securing holes 157 receive bolts 169 (see FIG. 7) that mount the standoff frames 160a,160b to the adjustment bar 140, as explained further below. Furthermore, the adjustment bar 140 includes other mounting features, such as a ridge 158 that engages the first die body 12.

As shown in FIGS. 4 and 7, the lip adjustment assembly includes a rotation inhibitor 116 coupled to the translator 112 and the rod 118. The rotation inhibitor 116 is configured to inhibit rotation of the rod 118 about a central axis A. The rotation inhibitor 116 includes a first portion 119a that mates with the cavity 132 of the translator 112, and a second portion 119b that mates with the channel 150 of the adjustment bar 140. As noted above, a cross-section dimension of both the first and second portions 119a and 119b are similar to the corresponding dimensions of the cavity 132 and the channel 150 (e.g. dimension Y). Thus, the rotation inhibitor 116 is rotationally fixed to both the translator 112 and rod 118. In other words, the rotation inhibitor 116 fixes rotation of the translator 112 and the rod 118 with respect to each other. Thus, in turn, inhibits rotation of the adjustment block 128 proximate the adjustment assembly. The rotation inhibitor 116 is unique in that typical lip adjustment assemblies are designed so that rotation of the adjustment block 128 are inhibited by a retainer bar fixed at a location proximate or adjacent to the adjustment block itself and the forward end 136 of the rod 118. This required removal of various components proximate the lips 16 and 18, such as the retainer bar, to access the adjustment blocks and rods, which is time consuming and cumbersome.

Turning now to FIGS. 4 and 5, the lip adjustment assembly 100 includes a plurality of standoff frames 160, such as a first standoff frame 160a and a second standoff frame 160b. In the illustrated embodiment, the second standoff frame 160b is opposite of the first standoff frame 160a to define an intermediate space 161 that extends between them. The first and second standoff frames 160a and 160b support the translator 112 within the intermediate space 161. The first standoff frame 160a and the second standoff frame 160b are similar to each other and for this reason only one standoff frame is described below. In the present disclosure, reference numbers 160a, 160b and 160 are used interchangeably to refer to a standoff frame.

Figure 8:
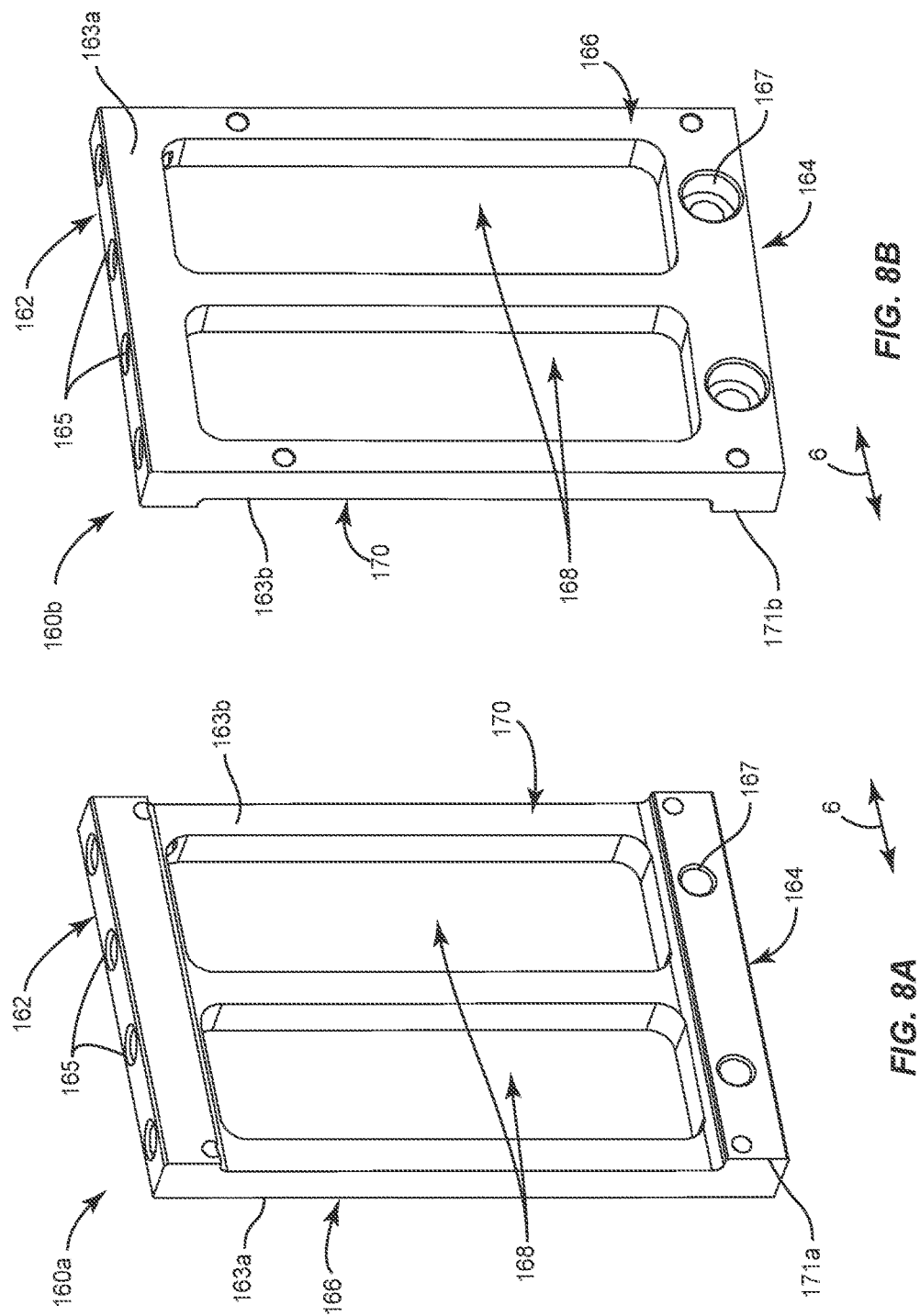
FIGS. 8A and 8B are perspective view of first and second standoff frames, respectively, of the lip adjustment assembly illustrated in FIG. 4.

As best shown in FIGS. 8A and 8B, each standoff frame 160a, 160b includes a top 162, a bottom 164 opposite the top 162, a first side 166, a second side 170 opposite the first side 166 along second direction 6 (or width), and one or more windows 168. Each frame includes a first outward face 163a and an interior face 163b opposite the first outward face 163a that faces the translator 112. Each frame top 162 includes top mounting holes 165 that extend in a direction toward the bottom 164 of the standoff frame 160. Mounting bolts 181 (see FIG. 5) extend through the top mounting holes 165 and couple the retainer assembly 180 to the standoff frames 160a, 160b, as explained below. Each standoff frame 160a, 160b, includes a projecting ridge, or interlock 171a, 171b that projects from the respective frame bottom 164. Each interlock 171,171b is sized to mate with respective keyways 154, 156 of the adjustment bar 140. Specifically, as best shown in FIG. 7, the first standoff frame 160a includes the first interlock 171a that mates the first keyway 154 and the second standoff frame 160b includes a second interlock 171b that mates the second keyway 156. Each frame bottom 164 also includes side mounting holes 167 extend along a direction from the first side 166 to the second side 170. The side mounting holes 167 are sized to receive securing bolts 169, which mount the bottom 164 of each standoff frame 160 to the adjustment bar 140, as best shown in FIG. 5.

Referring back to FIG. 5, the first and second standoff frames 160 are configured to support more than one translating unit 110. Specifically, the lip adjustment assembly 100 includes a plurality of translating units 110 aligned with respect to each other along the second direction 6. The first and second standoff frames 160a and 160b support the plurality of translating units 110. In the illustrated embodiment, the first and second standoff frames 160a and 160b support three translating units, notes as translating unit 110a, 110b, and 110c. The standoff frames 160 are sized to support more than three translating units. Typical lip adjustment assemblies have a single frame per translating unit. Accordingly, the standoff frames 160 as described herein support a plurality of translating units, resulting in weight savings over typical lip adjustment assemblies.

The retainer assembly 180 is best shown in FIGS. 4 and 5. The retainer assembly 180 includes a spacer 182 and a retainer plate 184. The spacer 182 is placed adjacent the top 162 of the standoff frames 160. The spacer includes mounting holes 185 that align with top mounting holes 165 of the standoff frames 160 and a central bore 186 that is sized to receive the adjustment screw 138 therethrough. The retainer plate 184 includes mounting holes 187 that align with mounting holes 185 of spacer 182 and the top mounting holes 165 of the standoff frames 160. The retainer plate 184 includes a central bore 188 that is sized to receive the adjustment screw 138 therethrough. The central bore 186 of the spacer 182 and the central bore 188 of the retainer plate 184 include a first retention portion 189a and a second retention portion 189b, respectively. The first and second retention portions 189a and 189b mate with corresponding portions of the adjustment nut 139 such that the adjustment nut 139 is rotationally fixed with respect to the retainer assembly 180. Mounting bolts 181 extend through the mounting holes 187 of the retainer plate 184 and mounting holes 185 of the spacer into engagement with the top mounting holes 165 in the standoff frames 160. Thus, the mounting bolts 181 secure the retainer assembly 180 to the standoff frames 160 while the retainer assembly 180 is secured to the adjustment nut 139 of the adjustment actuator 120. In this regard, the retainer assembly 180 secures the translating unit 110 to the standoff frames 160.

Figure 10:
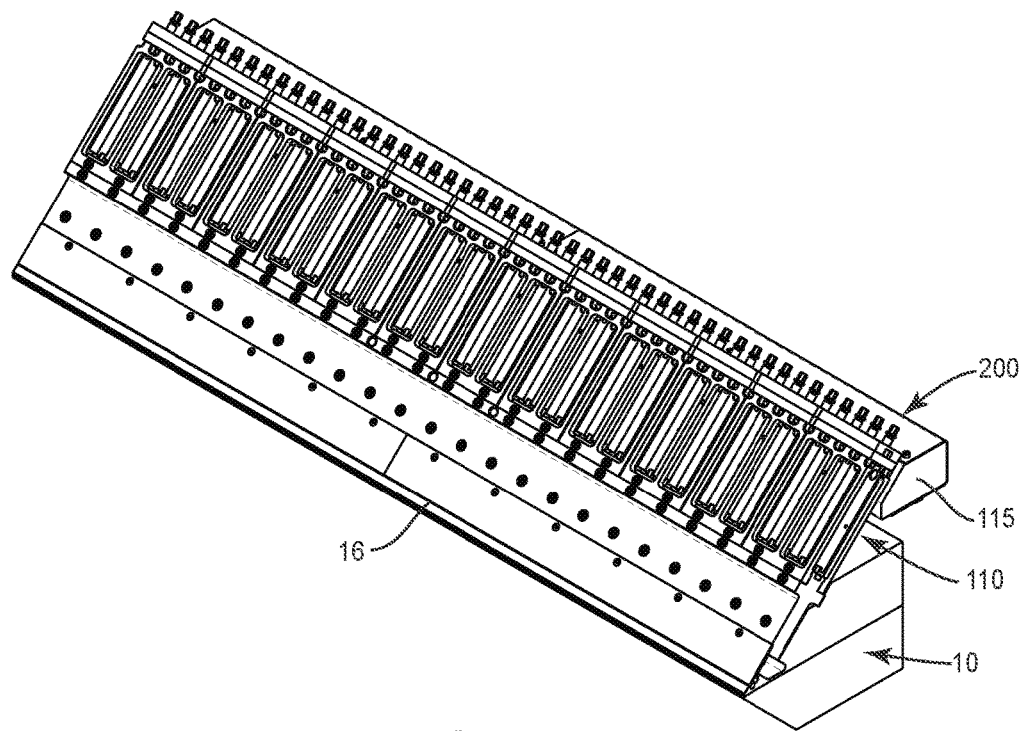
FIGS. 10 and 11 are perspective and side sectional views of an extrusion die, respectively, illustrating a lip adjustment assembly configured for ambient cooling according to an embodiment of the present disclosure.
Figure 11:
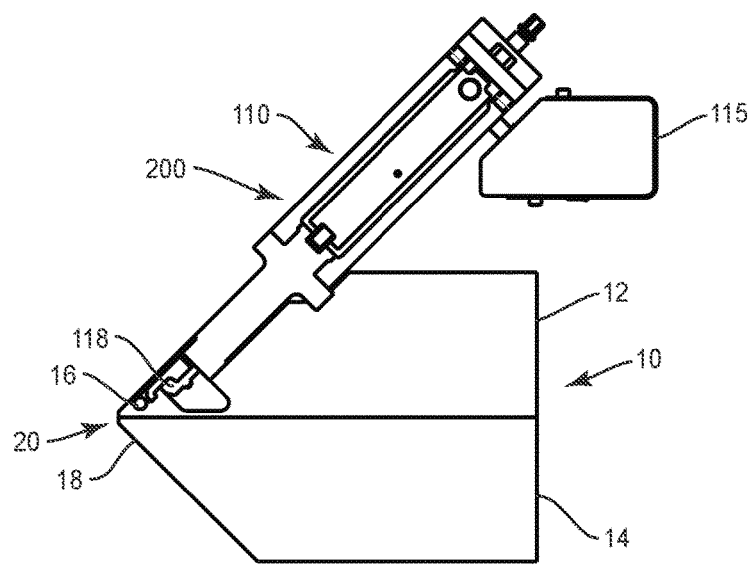

The lip adjustment assembly 100 illustrated in FIGS. 1-9 is configured for forced air cooling and includes a cover 111 (FIG. 1) over the translating units 110. Accordingly, the lip adjustment assembly 100 may include air control devices and conduits (not numbered) to to force air around the translators 112 to aid in cooling. For instance, forced air cooling can help reduce the temperature of the translator 112 more quickly, which can increase the response rate of the lip adjustment assembly 100 to a control instruction. In an alternative embodiment, however, the extrusion die system 1 can be configured for ambient cooling, such as the extrusion die shown in FIGS. 10 and 11. In FIGS. 10 and 11, a lip adjustment assembly 200 is illustrated mounted to first die body 12. The lip adjustment assembly 200 is substantially similar to the lip adjustment assembly 100 described above and illustrated in FIGS. 1-9. Similar reference numbers are used to identify features common to the lip adjustment assembly 100 and lip adjustment assembly 200. In accordance with the embodiment illustrated in FIGS. 10 and 11, the lip adjustment assembly 200 is devoid of a cover adjacent the translators 112 such that translators 112 are exposed to ambient air. Accordingly, the lip adjustment assembly 200 is configured for ambient cooling.

An embodiment of the present disclosure is a method for assembling an extrusion die 10 including a lip adjustment assembly 100, 200 mounted to the first die body 12. The extrusion die and lip adjustment assembly can be assembled during manufacturing or at installation site in accordance with the above description of the extrusion die 10 and the lip adjustment assembly 100 (or 200).

During use, however, certain components may need to be replaced, such as when typical maintenance is performed on the extrusion die. The lip adjustment assembly 100, 200 as described herein is configured to facilitate maintenance and provide fewer steps to access the translator and other component of the lip adjustment assembly 100, 200 compared to typical maintenance procedures used for typical lip adjustment assemblies. Accordingly, an embodiment of the present disclosure include a method for performing maintenance on an extrusion die 10 and lip adjustment assembly 100, 200 and is illustrated in FIGS. 12-17 described above. "Maintenance" as used herein includes disassembling the lip adjustment assembly, replacing or repairing a component thereof, and then reassembling the lip adjustment assembly.

Figure 12:
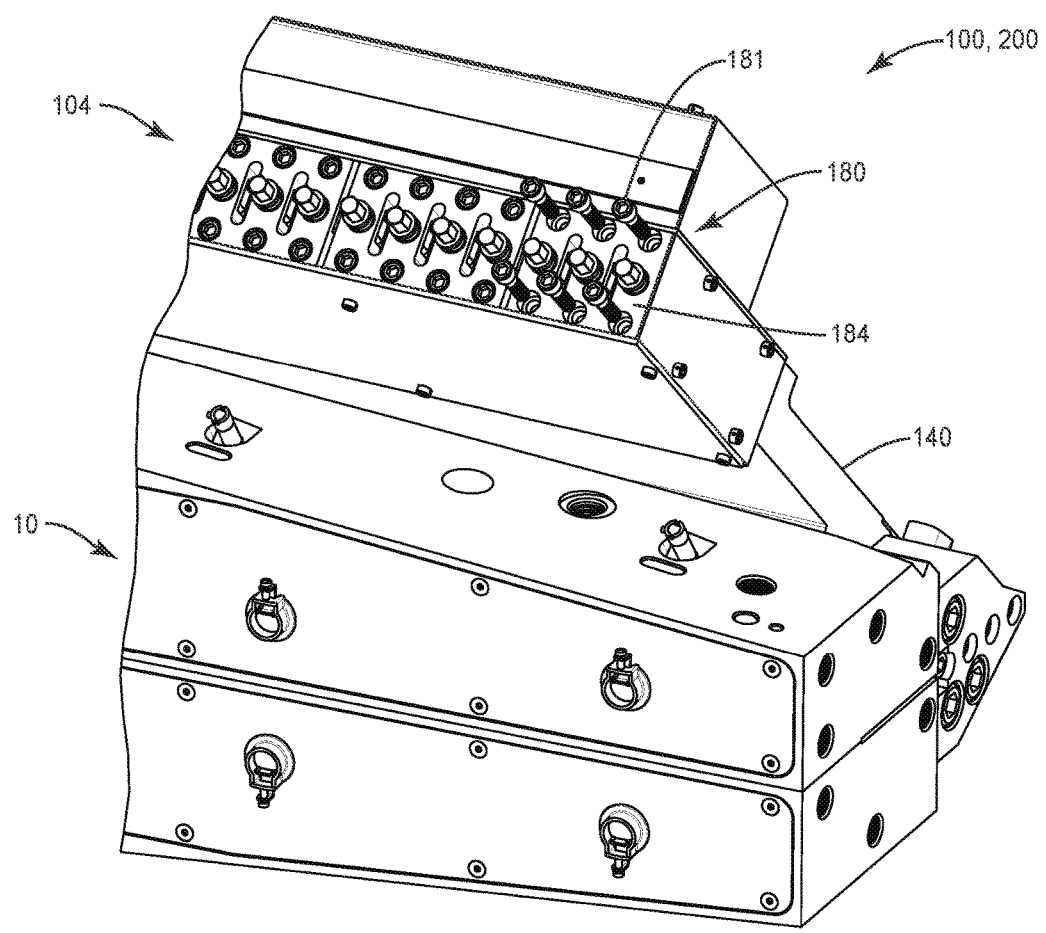
FIGS. 12 through 17B illustrate a method for conducting maintenance on the extrusion die illustrated in FIGS. 1-11, according to an embodiment of the present disclosure.
Figure 13:
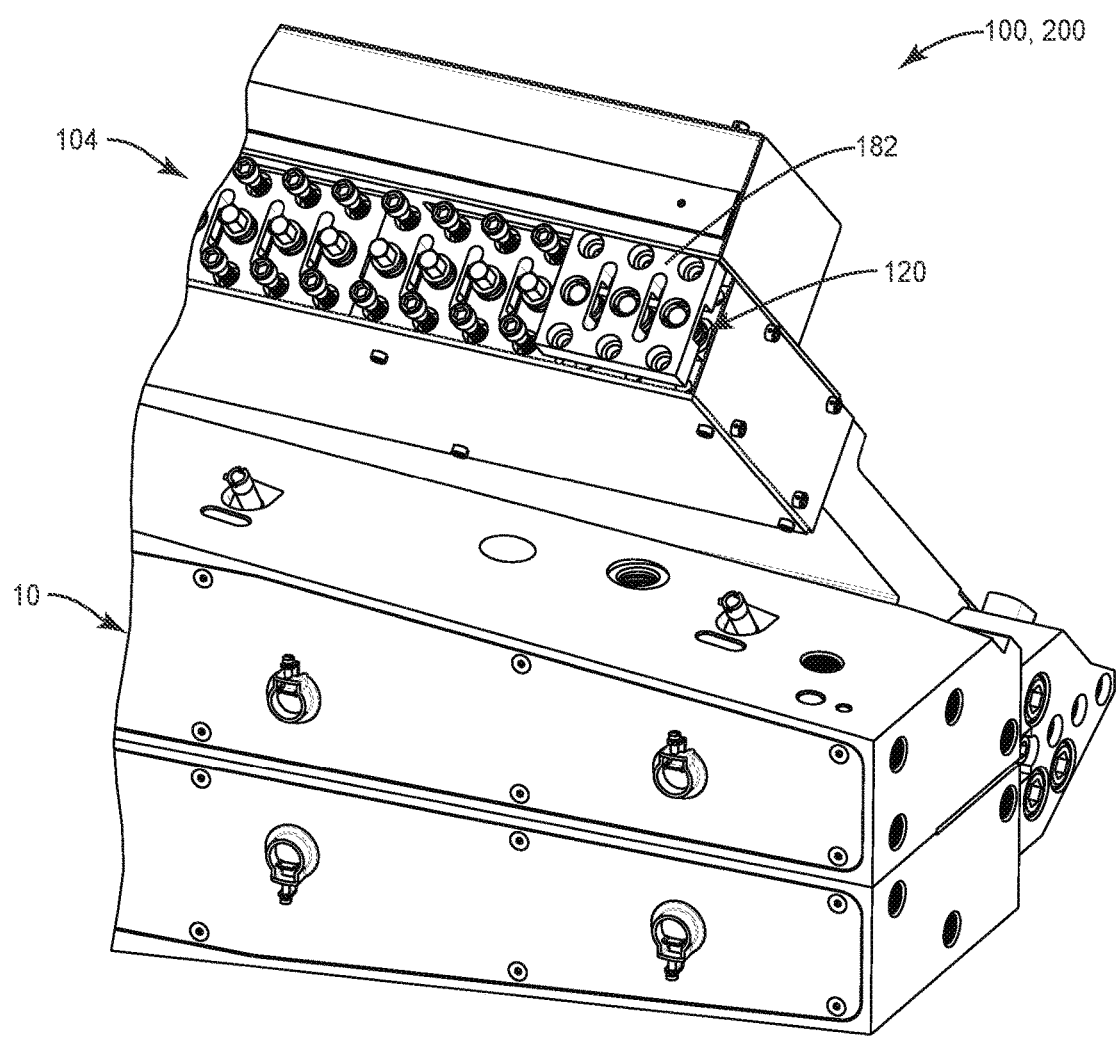
Figure 14:
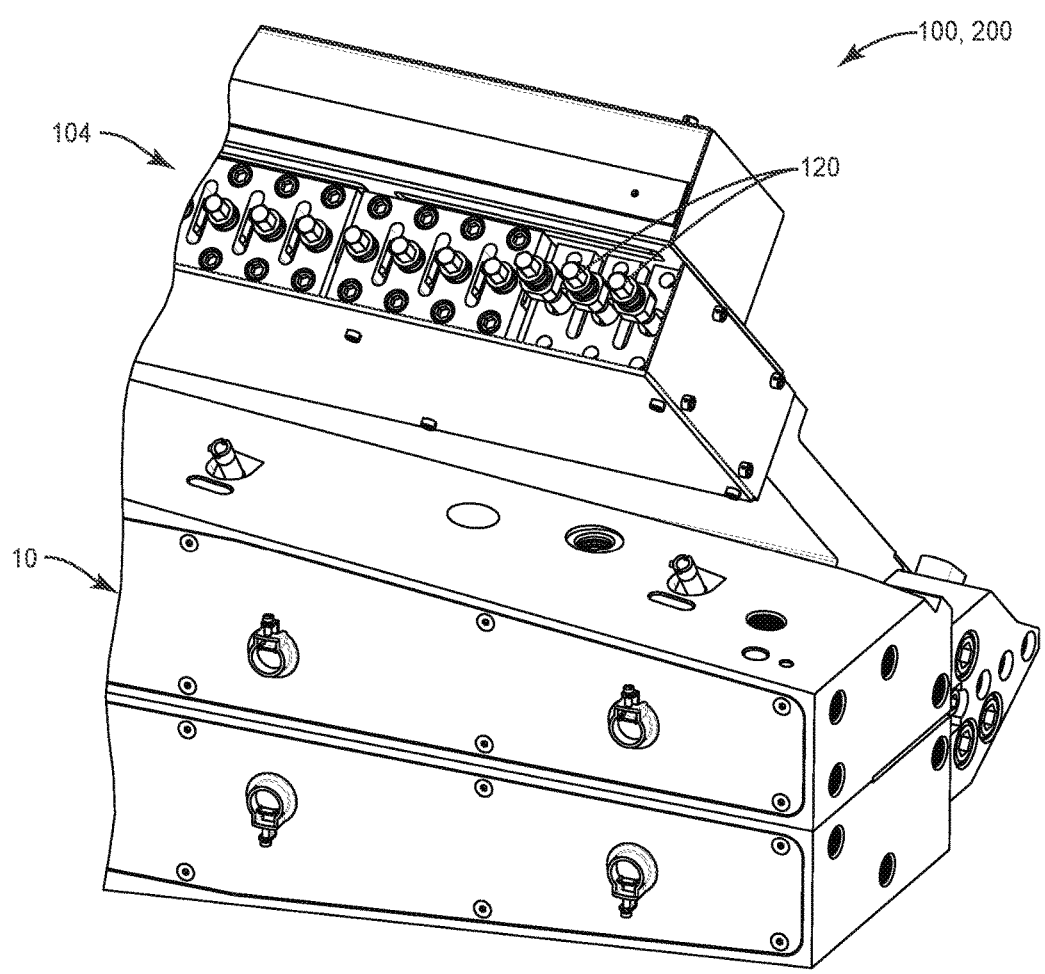
Figure 15:
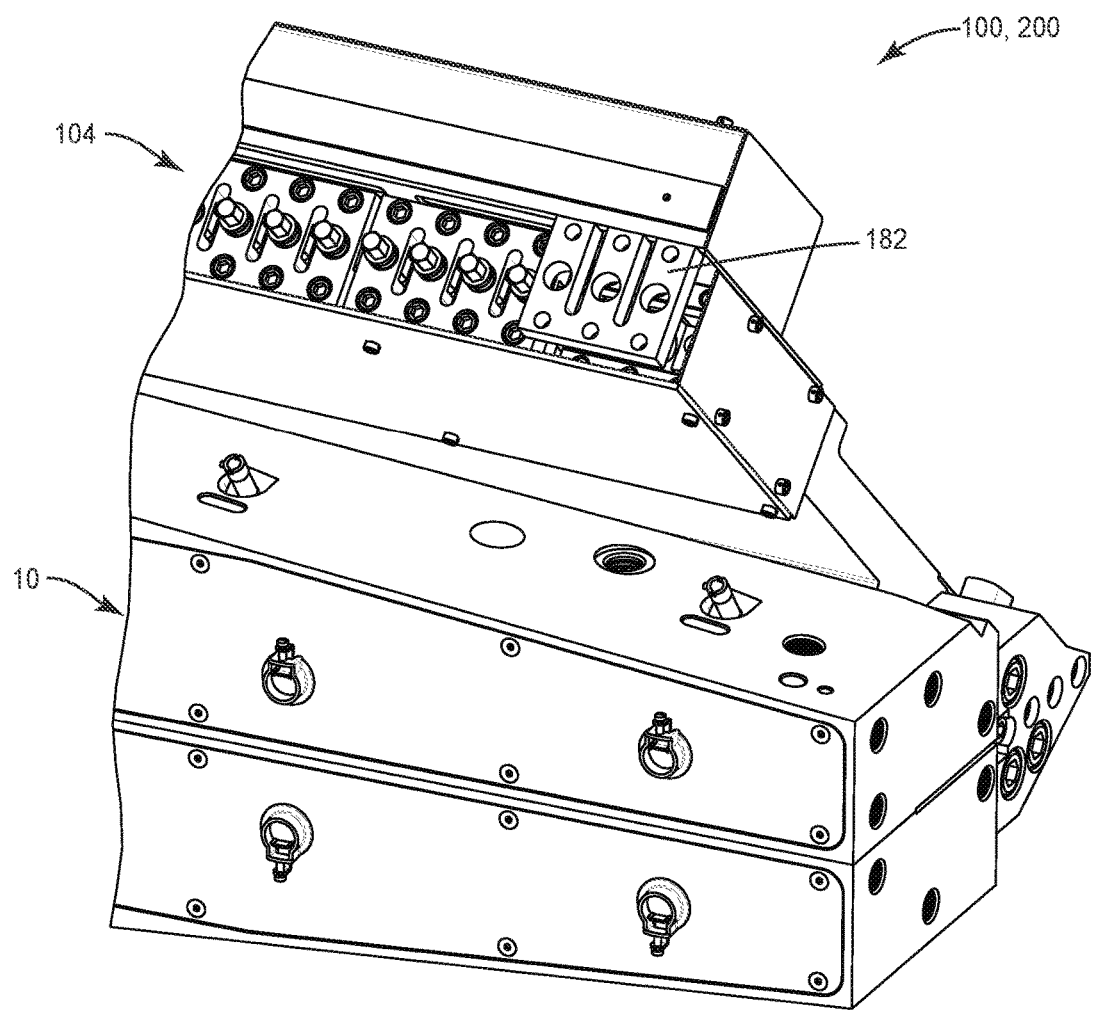
Figure 16A:
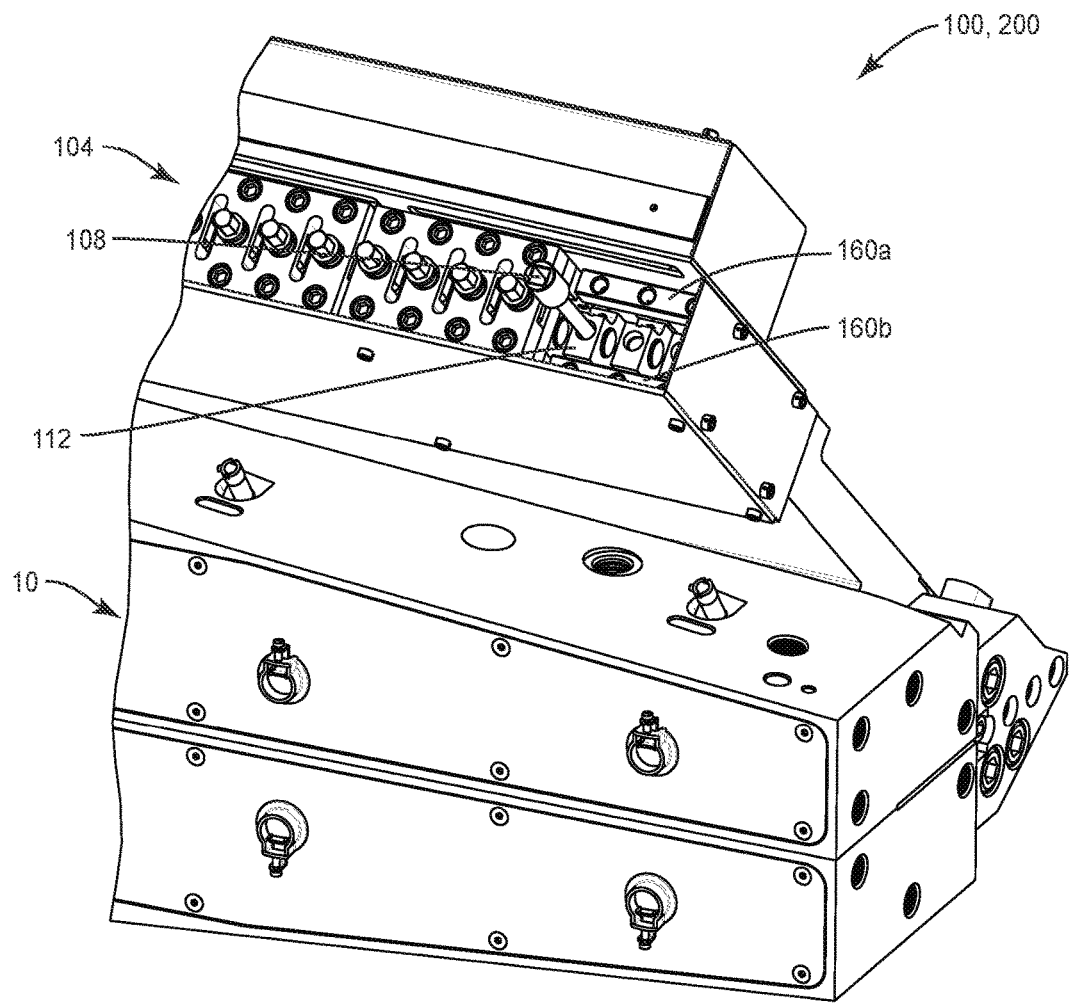
Figure 16B:
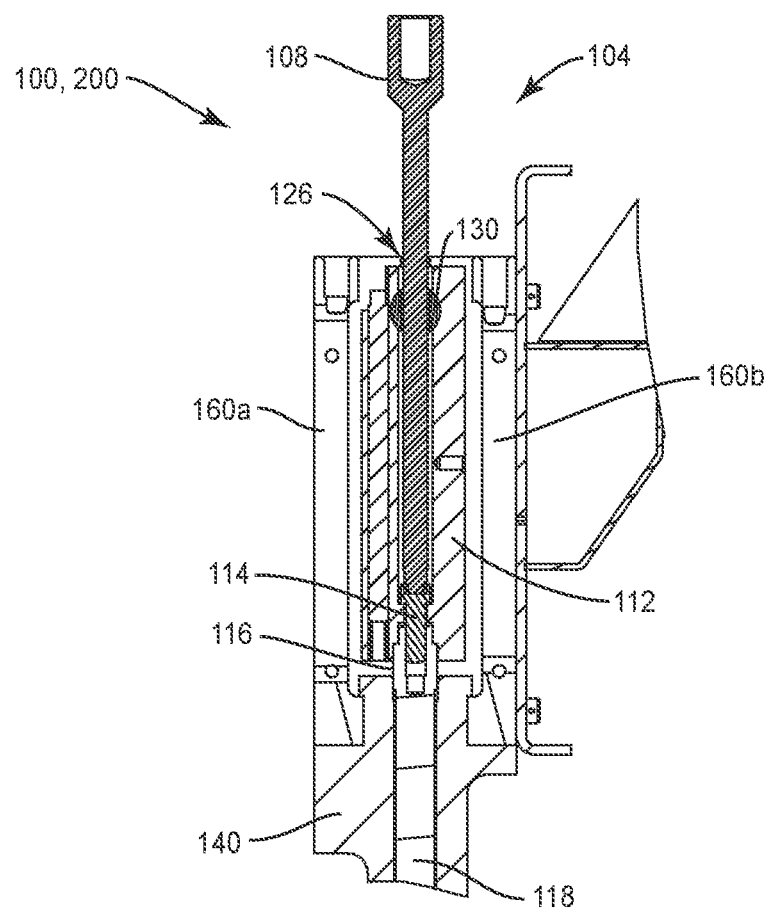
Figure 17A:
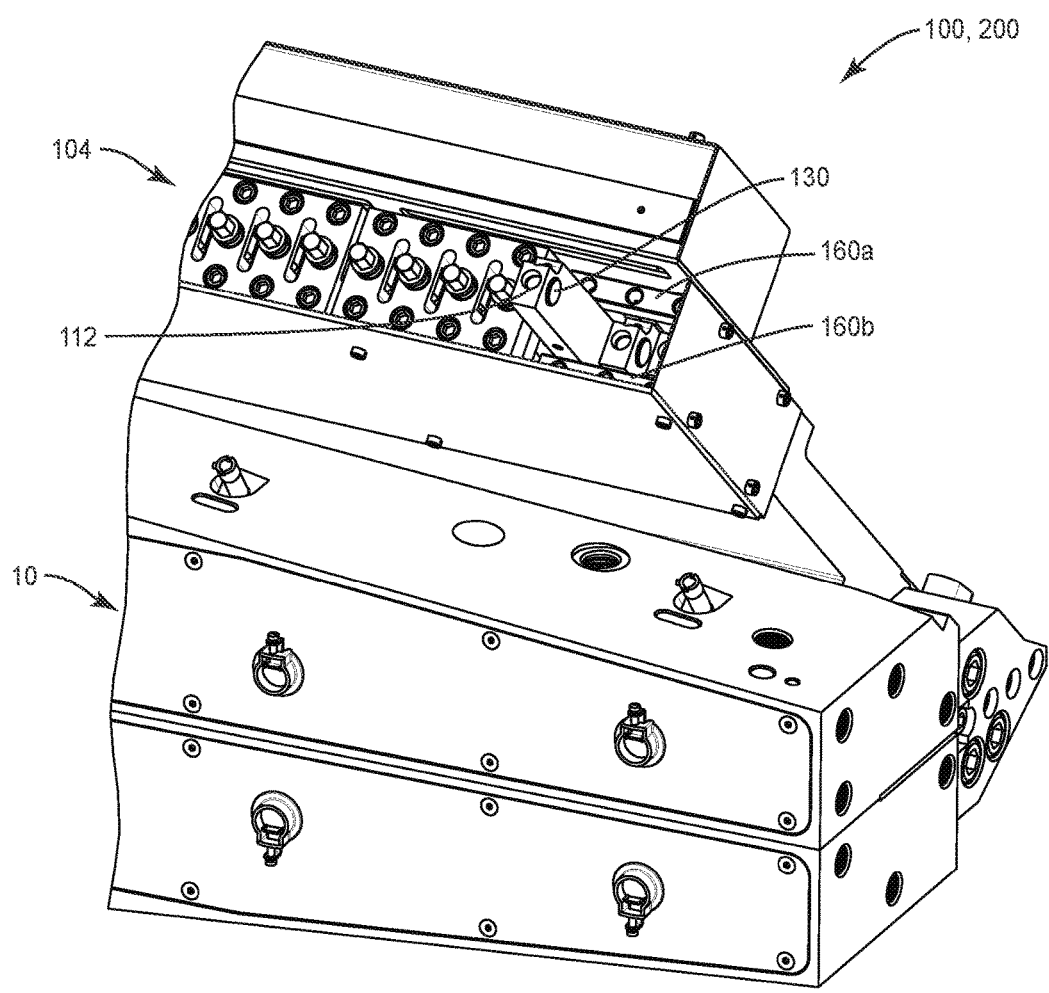
Figure 17B:
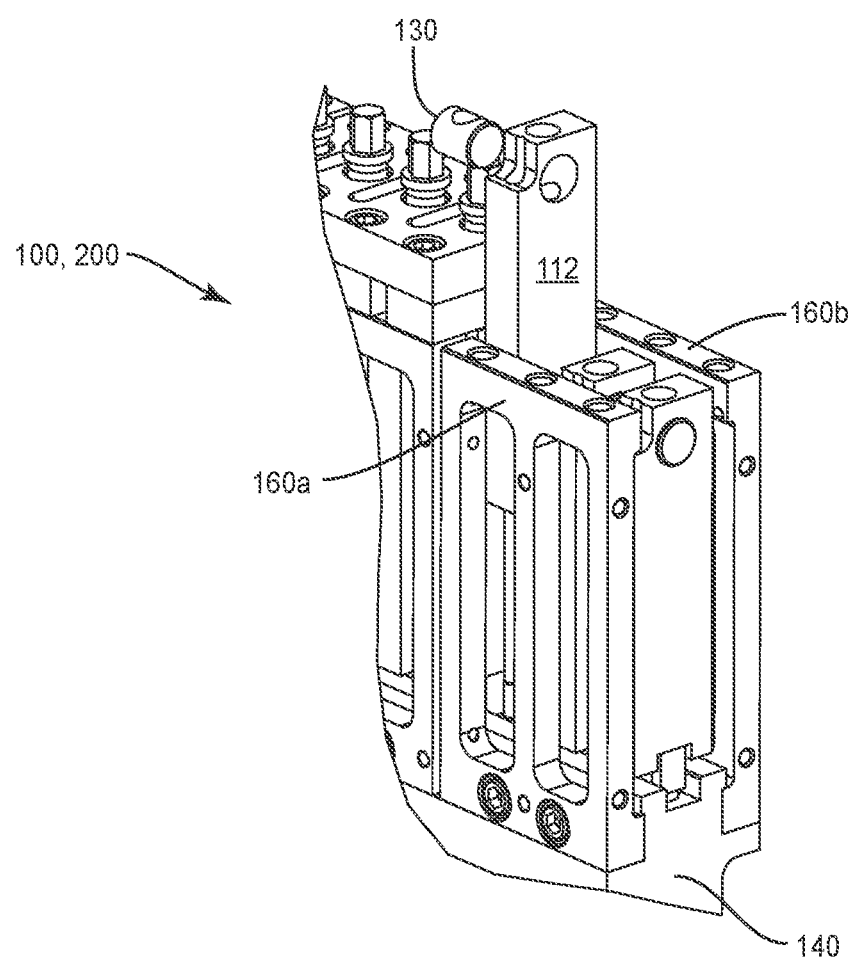

Turning to FIGS. 12-17, in this regard, the method includes accessing a translator of the lip adjustment assembly through an exposed end 104 of the lip adjustment assembly. The accessing step removes the retainer assembly 180 from the lip adjustment assembly 100. As shown in FIGS. 12 and 13, the accessing step thus includes removing mounting bolts 181 from the retainer assembly 180 and then removing a retainer plate 184. Then, as shown in FIG. 14, the method proceeds by removing an adjustment actuator 120 from the translator 112. As shown in FIG. 15, the spacer 182 is also removed from the first and second standoff frames 160. Next, as shown in FIGS. 16A and 16B, the translator 112 is decoupled from the rod 118. A tool 108 is placed through the chamber 126 into engagement with the mounting member 114. The tool 108 is actuated to decouple the mounting member 114 from the rod 118, which decouples the translator 112 from rod 118. In FIG. 17, the translator 112 is removed from the lip adjustment assembly 100 with the rod 118 in place.

With the translator 112 removed from lip adjustment assembly 100, any needed components of the translating unit can be replaced, such as the threaded adjustment insert 130, the translator, etc. After the replacing step, the translator 112 is inserted into back into the lip adjustment assembly 100 in alignment with the rod 118. The translator 112 is the re-coupled the rod 118 via the mounting member 114 using tool 108. After the translator 112 is coupled the rod 118, the spacer 182 is positioned on the top 162 of the first and second standoff frames 160. The adjustment actuator 120 is inserted through the spacer 182 into the engagement with the translator 112. Then, the retainer plate 184 is then coupled to the spacer 182. Bolts then secure the retainer assembly 180 to the translating unit 110.

It will be appreciated by those skilled in the art that various modifications and alterations of the present disclosure can be made without departing from the broad scope of the appended claims. Some of these have been discussed above and others will be apparent to those skilled in the art. The scope of the present disclosure is limited only by the claims.

What is claimed is:

1. A method of using a lip adjustment assembly mounted to a die body of an extrusion die to replace one or more components of the lip adjustment assembly, the method comprising:
    accessing a translating unit of said lip adjustment assembly through an exposed end of said lip adjustment assembly;
    removing an adjustment actuator from a translator of said translating unit;
    decoupling said translator from a rod of said translating unit so that said translator is removable from said lip adjustment assembly and with respect to said rod;
    after decoupling said translator from said rod, removing said translator from said lip adjustment assembly; and
    replacing a first component of said translating unit with a second component of said translating unit.

2. The method of claim 1, further comprising:
    before decoupling said translator from said rod, removing a retainer assembly that secures said translating unit within said lip adjustment assembly;
    after replacing said first component with said second component;
    inserting said translator into said lip adjustment assembly in alignment with said rod;
    coupling said translator to said rod via a mounting member;
    after coupling said translator to said rod, positioning said retaining assembly on said translator so as to couple said translating unit to lip adjustment assembly; and
    inserting said adjustment actuator through said retainer assembly and into engagement with said translator of said translating unit.

3. The method of claim 2, wherein removing the retainer assembly comprises removing mounting bolts and then a retainer plate that secures said translating unit within said lip adjustment assembly.

4. The method of claim 2, wherein decoupling said translator from said rod comprises actuating a tool to decouple the mounting member from said rod.

5. The method of claim 4, wherein coupling said translator to said rod via said mounting member comprises using said tool to couple said translator to said rod via said mounting member.

6. The method of claim 2, further comprising after inserting said adjustment actuator, securing the retainer assembly to said translating unit.

7. The method of claim 2, wherein removing said adjustment actuator from said translator of said translating unit comprises removing a spacer.

8. The method of claim 7, further comprising after coupling said translator to said rod, positioning said spacer.

9. The method of claim 1, wherein removing said translator from said lip adjustment assembly comprises maintaining said rod in said translating unit.

10. The method of claim 1, further comprising inhibiting rotation of said rod.

\* \* \* \* \*